Nov. 20, 1923.                                                        1,474,697
                          I. H. WILSEY
                  INTERNAL COMBUSTION ENGINE
                   Filed April 26, 1919        2 Sheets-Sheet 1
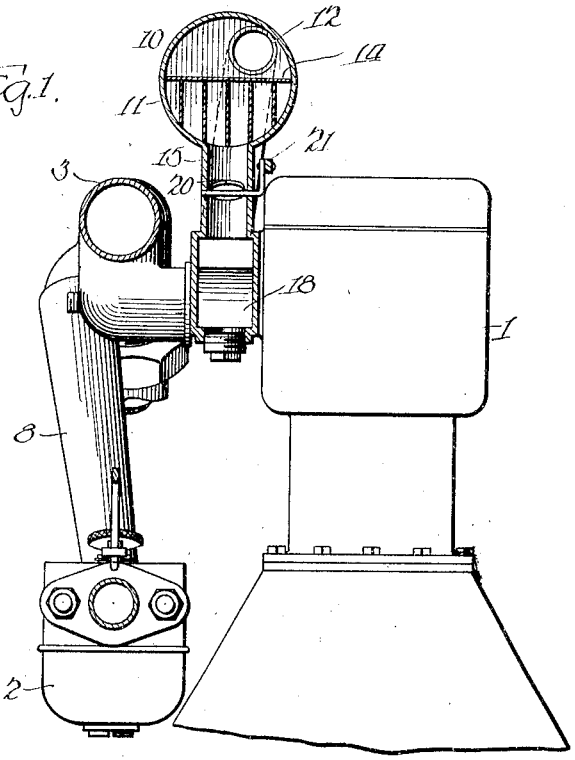
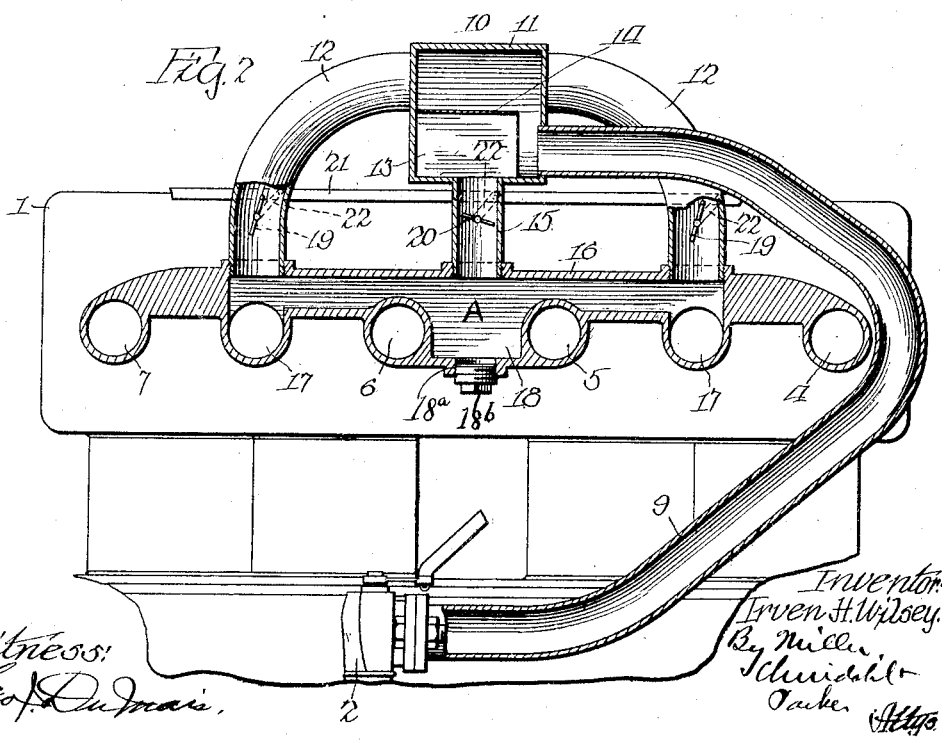

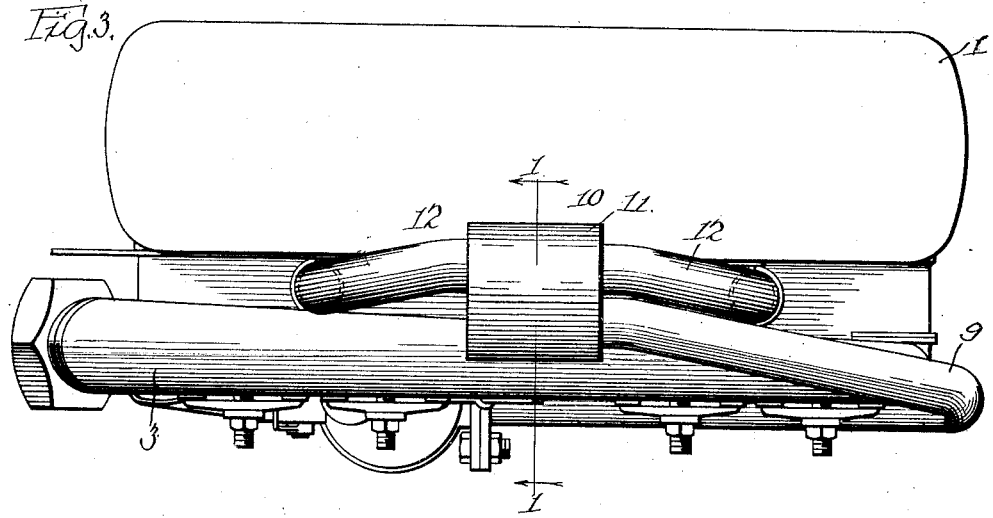
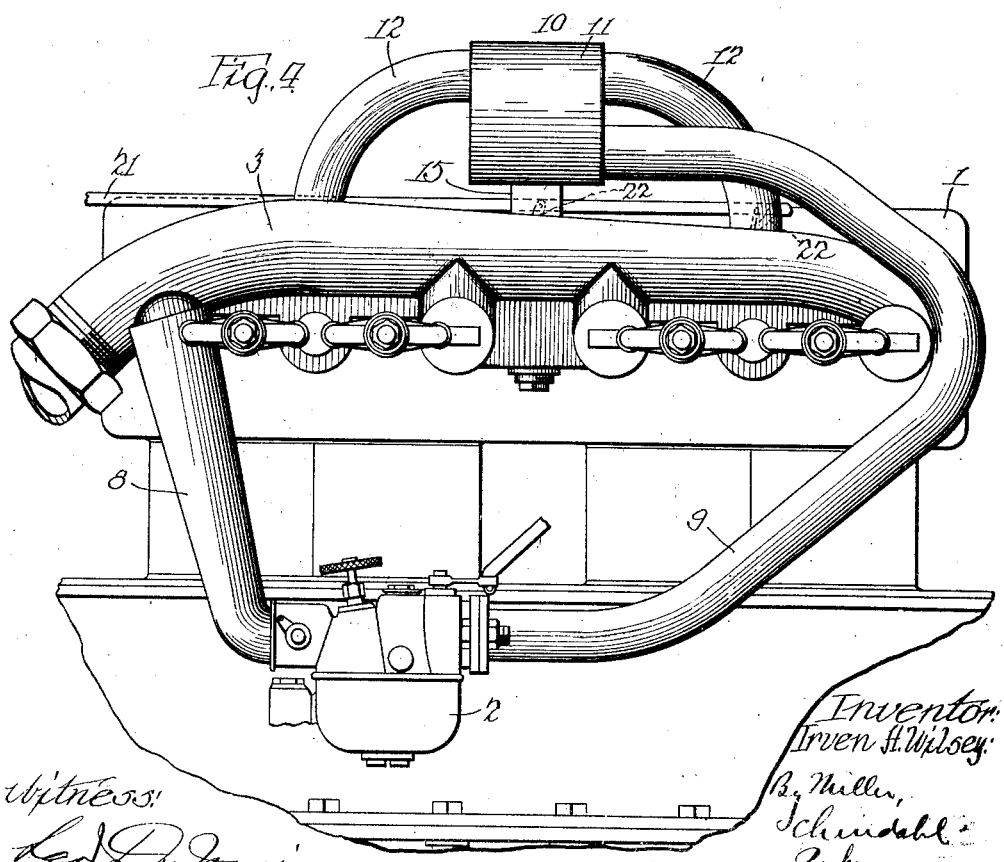

Patented Nov. 20, 1923.

1,474,697

UNITED STATES PATENT OFFICE.

IRVEN H. WILSEY, OF CHICAGO, ILLINOIS, ASSIGNOR, BY MESNE ASSIGNMENTS, TO WILSEY INCORPORATED, A CORPORATION OF DELAWARE.

INTERNAL-COMBUSTION ENGINE.

Application filed April 26, 1919. Serial No. 292,919.

*To all whom it may concern:*

Be it known that I, IRVEN H. WILSEY, a citizen of the United States, residing at Chicago, in the county of Cook and State of Illinois, have invented certain new and useful Improvements in Internal-Combustion Engines, of which the following is a specification.

This invention relates particularly to an apparatus for producing a combustible mixture to be supplied to the engine cylinders, and has special reference to the conditions arising in the use of a liquid fuel, a portion of which does not readily volatilize under the conditions usually present in automobile operation. Ordinary hydrocarbon fuels comprise one or more fractions which do not readily volatilize. It has heretofore been the practice to provide devices for heating the entire mixture issuing from the carburetor or mixing valve, whereby not only the less readily volatilized fuel fractions but also the air and easily volatilized fuel fractions are heated. The heating of the mixture, of course, reduces its density.

The principal factor in obtaining the greatest volumetric efficiency from a given internal-combustion engine is to have the densest possible gas over the inlet valve. It follows, therefore, that if maximum horsepower is desired the mixture should not be rarefied by a greater degree of pre-heating than is necessitated by the nature or condition of the fuel.

If we assume for the sake of illustration, that the engine is running on a mixture of fourteen parts of air by weight to one part of fuel, all other conditions remaining the same, then a rise in temperature from 32° to 523° Fahrenheit results in a fifty per cent reduction of the density of the mixture, with consequent reduction of horse-power. Neglecting specific heats of the liquid and air for the purpose of simple illustration, we may say that only about one-fifteenth of the mixture requires heat treatment, the heating of the other fourteen-fifteenths being undesirable when power requirements are great.

The object of the present invention, generally stated, is to provide an apparatus whereby that portion of the fuel which requires pre-heating shall always be pre-heated and whereby the remainder of the mixture shall or shall not be pre-heated as determined by fuel quality, atmospheric conditions, speed, load, etc. The method disclosed herein forms the subject of another application by applicant, Serial Number 292918 filed April 26, 1919.

In the accompanying drawings, Figure 1 is a view of an apparatus embodying the features of my invention, a portion of the apparatus being shown in vertical section in the plane of line 1—1 of Fig. 3. Fig. 2 is a side elevation with parts in section. Fig. 3 is a top plan view, and Fig. 4 is a side elevation.

1 denotes an engine of any suitable type. 2 is a carburetor of any common or preferred construction. 3 is the exhaust manifold. The manifold 3 is connected in the usual or any preferred manner to the exhaust passages 4, 5, 6 and 7 of the engine. If desired, the carburetor may be provided with a heating stove 8 of ordinary form. 9 is a tube extending from the outlet of the carburetor 2 to a separator 10. The function of this separator is to separate from the current passing therethrough the liquid particles which require pre-heating in order to bring about volatilization. Various forms of separators may be employed. That herein shown comprises a casing 11, the lower portion of which is connected at one end with the tube 9. The opposite ends of the casing 11 are connected at their upper portions to tubes 12. In the lower portion of the casing 11 is a plurality of vertical partitions 13 above which is a horizontal partition 14. The partitions 13 are directed toward the inlet of the casing 11, the ends of the partitions 13 and 14 being spaced away from the inlet of said casing, as shown in Fig. 2.

In the bottom of the casing 11 is a port which is connected to the central portion of an inlet manifold 16. The ends of the manifold 16 communicate with the engine cylinders through the inlet passages 17. The tubes 12 communicate with the ends of the manifold 16 adjacent to the passages 17. The exhaust passages 5 and 6 extend in close proximity to the central portion of the inlet manifold 16 at opposite sides of and below the juncture of the tube 15 with the manifold. A pocket 18 is formed between the exhaust passages 5 and 6 and directly below the tube 15. Sand or other impurities which may collect in the pocket 18 may be removed through an opening 18$^a$ which is normally closed by a plug 18$^b$. The central portion of the manifold 16 forms a heating chamber A.

The tubes 12 are preferably of relatively thin metal, so that a relatively small amount of heat shall be conducted to said tubes from the exhaust passages and exhaust manifold.

Means is provided for controlling the flow through the tubes 12 and 15. Herein I have shown a butterfly valve 19 in each of the tubes 12 and a similar valve 20 in the tube 15. These valves are preferably connected to a common operating device, as, for example, a rod 21, by means of crank arms 22, the element 21 being arranged in any suitable manner for convenient operation by the driver or for actuation by any suitable means. The valve 20 is so arranged as always to allow the flow of liquid fuel past it.

Assuming conditions to be such that maximum power is desired, the operating element 21 is actuated to open the valves 19 and place the valve 20 in nearly closed position. The operation of the engine pistons causes a pressure drop at the inlet ports 17 and a rush of air through the carburetor 2. The air picks up and entrains globules of liquid fuel and flows through the conduit or tube 9 to the separator 10 where the difference in inertia causes the liquid particles to be separated from the gases, the liquid portion dripping past the valve 20 and entering the heated central portion of the inlet manifold 16. Here the liquid particles are volatilized and pass through the end portions of the manifold 16 to the inlets 17. The gases leave the separator casing 11 through the tubes 12 and pass thence to the inlets 17 without being subjected to pre-heating. Only an inconsequential portion of the gas enters the manifold 16 through the tube 15.

It will be seen that practically only that portion of the mixture which requires pre-heating is subjected to such treatment and that consequently the density of the mixture is reduced to only a very slight extent.

When the power requirements are light, the valves 19 may be closed and the valve 20 opened, whereupon all of the mixture will enter the inlet manifold through the tube 15 and be pre-heated, thereby greatly reducing the density of the mixture with consequent economy of fuel.

As will be apparent, the valves 19 and 20 may be placed in any desired intermediate position to effect pre-heating of any desired percentage of the mixture.

I would have it understood that the foregoing detailed description has been given for the sake of imparting a clear understanding of the invention and not with the intention of limiting the invention to the disclosed form and arrangement of parts. On the contrary, the spirit and scope of the invention are to be determined in view of the prior art and the appended claims.

I claim as my invention:

1. An internal-combustion engine having, in combination, engine cylinders, a carburetor, a separator, a conduit extending from the carburetor to the separator, two passageways extending from the upper portion of the separator to the inlets of the engine cylinders, a heater communicating with said inlets, a passageway extending from the lower portion of the separator to the heater, a valve in each passageway, and means for simultaneously operating said valves, the valves in the first mentioned passageway being arranged to close as the valve in the other passageway opens, and vice versa.

2. An internal-combustion engine having, in combination, engine cylinders, a carburetor, a separator, a conduit extending from the carburetor to the separator, two passageways extending from the separator to the inlets of the engine cylinders, a heater communicating with said inlets, a passageway extending from the separator to the heater, a valve in each passageway, and means for simultaneously operating said valves.

3. An internal-combustion engine having, in combination, an engine cylinder, a carburetor, a separator, a conduit extending from the carburetor to the separator, a passageway extending from the upper portion of the separator to the inlet of the engine cylinder, a heater communicating with said inlet, a passageway extending from the lower portion of the separator to the heater, a valve in each passageway, and unitary means for operating both of said valves.

4. An internal-combustion engine having, in combination, engine cylinders, a carburetor, a separator, a conduit extending from the carburetor to the separator, two passageways extending from the separator to the inlets of the engine cylinders, a heating chamber located below the separator and between and communicating with said inlets, and a passageway extending from the separator to the heating chamber, said cylinders having two exhaust passages at opposite sides of and below said chamber for heating the latter.

5. An internal combustion engine having, in combination, a carburetor, a separator adapted to separate particles of unvolatilized fluid from the mixture delivered by said carburetor, means for allowing the liquid so separated to fall by gravity into a heating chamber, means for mixing a variable percentage of the gaseous mixture with the liquid before it enters the heating chamber, and means for returning the heated portion of the mixture to the remainder thereof.

In testimony whereof, I have hereunto set my hand.

IRVEN H. WILSEY.